United States Patent

[11] 3,584,745

| [72] | Inventor | Robert William Wrightson<br>Edwardstown, South Australia |
|---|---|---|
| [21] | Appl. No. | 822,205 |
| [22] | Filed | May 6, 1969 |
| [45] | Patented | June 15, 1971 |
| [73] | Assignee | Hills Industries Limited<br>Edwardstown, South Australia |
| [32] | Priority | May 8, 1968 |
| [33] | | Australia |
| [31] | | 37478 |

[54] EXTENSIBLE CLOTHES LINE
7 Claims, 4 Drawing Figs.

[52] U.S. Cl. .................................................. 211/119.15,
242/100.1
[51] Int. Cl. ..................................................... B65h 75/48,
D06f 53/02
[50] Field of Search .......................................... 211/119.15,
119.09, 119.01; 242/100.1, 100, 100.2, 99, 86.1,
129.8; 254/161, 164, 190; 256/40, 31, 41

[56] References Cited
UNITED STATES PATENTS

| 2,490,154 | 12/1949 | Pearson | 211/119.15 |
| 2,865,514 | 12/1958 | Goodman | 211/119.15 |
| 2,872,047 | 2/1959 | Ostlund | 211/119.15 |
| 2,914,188 | 11/1959 | Hansen et al. | 211/119.15 |
| 3,263,939 | 8/1966 | Menkin | 211/119.15 X |

FOREIGN PATENTS

| 234,097 | 5/1961 | Australia | 211/119.15 |

Primary Examiner—Ramon S. Britts
Attorney—Cushman, Darby and Cushman

ABSTRACT: An extensible clothes line of the type having a series of lines secured to a spring loaded rotational drum, wherein the lines are fully extended from the drum and further tension does not rotate the drum against spring pressure when the spreader bar is engaged on its retention means, tensioning of the line being achieved by rotating the spreader bar to thereby wrap the lines around it.

PATENTED JUN 15 1971

Inventor
Robert William Wrightson
By Cushman, Darby & Cushman
Attorneys

EXTENSIBLE CLOTHES LINE

This invention relates to an extensible clothesline of the type which employs a rotational drum having a series of clotheslines wound thereon, the other ends of the lines being tied to a spreader bar.

Clotheslines of this general type are well known and usually employ spring return mechanisms to wind the drum for retraction of the spreader bar. It is usual for a user of the clothesline to withdraw the spreader bar from the drum against spring pressure, and to position the spreader bar on to some sort of hook arrangement, and then to return the drum and to rotate the drum so as to tension the clotheslines, utilizing a ratchet arrangement which can be released when it is desired to return the clothesline on to the drum.

The main object of this invention is to provide improvements whereby a ratchet drum becomes unnecessary, and the invention may in one of its forms comprise retention means spaced from the drum and having abutment means cooperable with the spreader bar to releasably retain the spreader bar, the retention means further having rotation limiting means engageable with but releasable from the spreader bar, whereby the spreader bar when abutting the abutment means and rotated, winds the lines around the bar and thereby tensions the lines.

The abutment means could take any one of a number of forms, and for example could simply be constituted by a member defining rectangular slots cooperating with a rectangular spreader bar and arranged so that the spreader bar can be rotated in enlarged portions of the slots, to wind the lines on the spreader bar and then be positioned in other portions of the slots to prevent unwinding, or if desired use can be made of a series of pulleys and the tension bar could engage a ratchet or other means on the retention post (if a post is used) or alternatively the tensioning means could be constituted by a tubular spreader bar having depressions or other noncircular faces forming ratchet faces therein, the ratchet faces being engaged by releasable pawls, and the spreader bar being arranged to be engaged within hook members on the retention means and rotated therein, but being releasable upon release of the pawls for return of the line.

When springs are used in extensible clotheslines, the springs are usually housed within the drum which carries the clotheslines, the spring usually being a wire spring of considerable length which is retained by a central shaft. So as to reduce the possibility of a line winding itself coil upon coil over the drum, so that uneven winding results, the spring is usually fairly high in tension, and this is inconvenient in some instances for users who are not able to apply great force. One of the objects of this invention therefore is to reduce the tension of the spring for retracting the drum, and the invention may include as a further feature the drum being within a housing having end plates, the drum having end members with outstanding flanges adjacent the end plates, and the aperture within the housing for delivery of a line being spaced inwardly from the end plates by an amount sufficient that there will be little tendency for the lines to wind over the ends of the drum, so that even if the lines retract coil upon coil around the drum and an uneven tensioning results there is little danger of the lines slipping from the drum ends and thereby becoming difficult to release.

When springs are used for retraction, it is usual for them to be supported by a central shaft which is very small in diameter, and under these circumstances it is possible for the spring itself to form an envelope shape which is helical, and this can stress certain portions of the spring excessively. The invention may in one of its forms further include a central stem which is at least half the diameter of the retraction spring, in its free state.

Tensioning of the spring becomes a matter of some importance particularly as the spring ages and tends to lose its tension through fatigue, and to facilitate tensioning of the spring the invention in one of its forms may further include as a feature a central stem rotational within the end plates of the drum housing, the spring being secured at one end to the central stem and at the other end to the drum housing, the central stem being provided with means to lock it against rotation in a direction counter to the spring, said means however being adjustable.

An embodiment of the invention is described hereunder in some detail with reference to and is illustrated in the accompanying drawings, in which.

Figure 3:
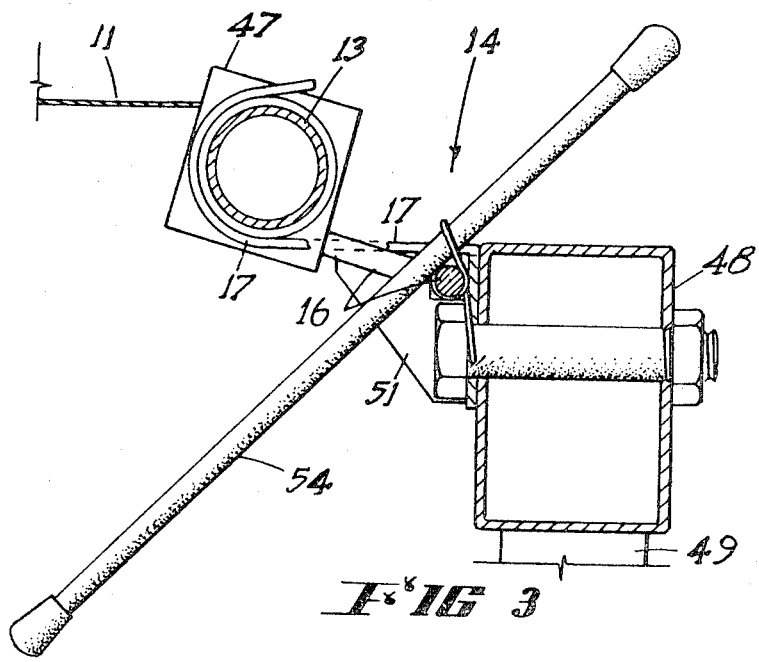
FIG. 3 is a central cross section through the spreader bar, and showing retention means and rotation limiting means.
Figure 4:
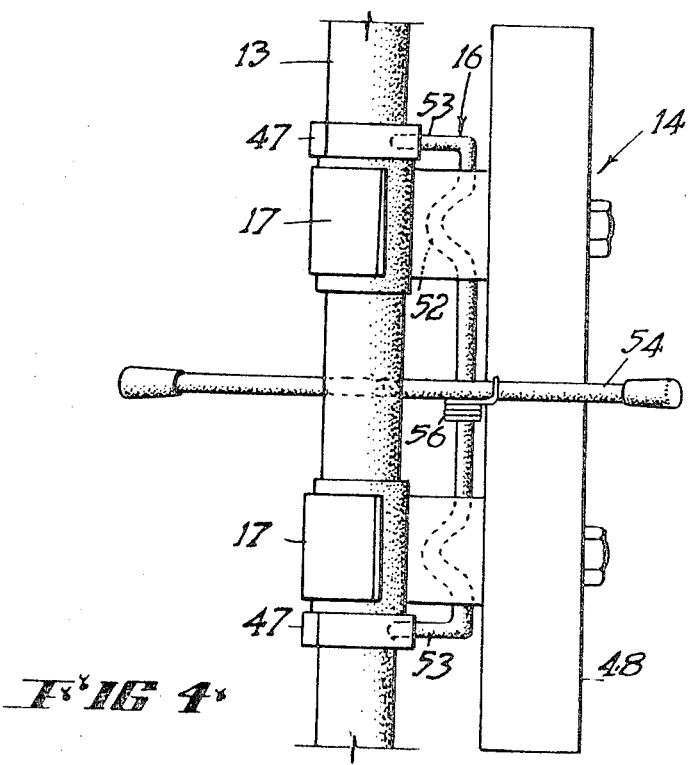
FIG. 4 is a fragmentary plan of FIG. 3, but to a reduced scale.

According to this embodiment an extensible clothesline 10 is provided with a series of lines 11 secured at respective ends to a drum 12 and a spreader bar 13, and is provided with retention means 14 (FIGS. 3 and 4) having rotation limiting means constituted by the pawl 16, and abutment means constituted by the hook members 17 within which the spreader bar 13 is rotatable but from which it is releasable.

Figure 1:
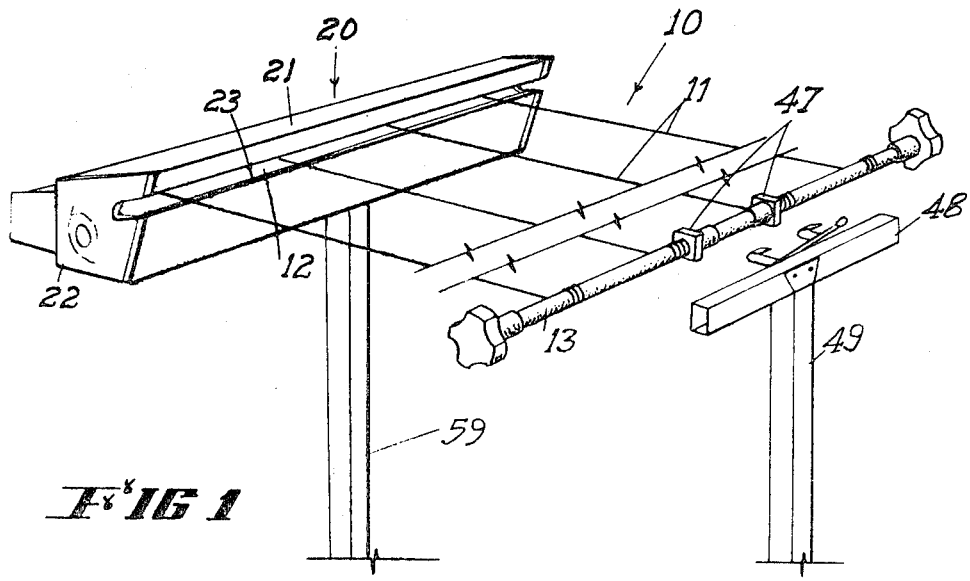
FIG. 1 is a part perspective view showing a clothesline partly extended.
Figure 2:
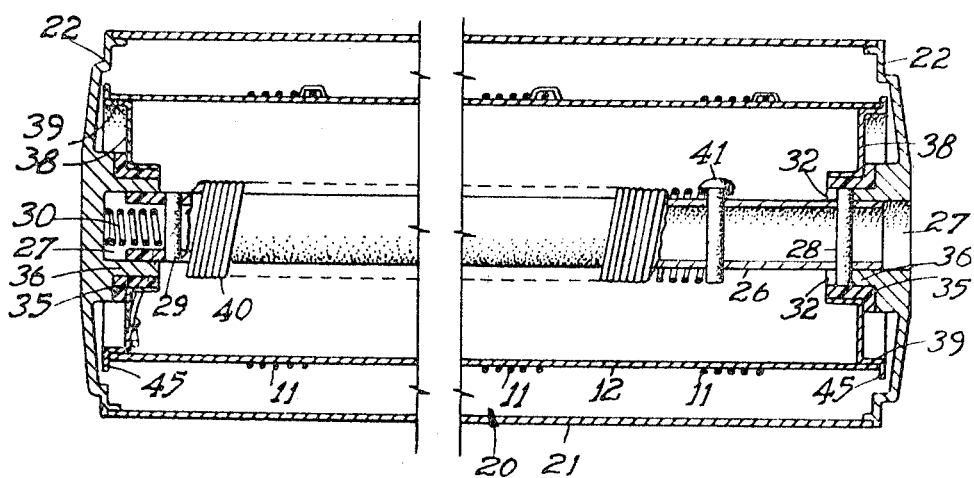
FIG. 2 is a central longitudinal section through a drum.

A drum housing 20 (FIGS. 1 and 2) is formed from sheet metal 21 and a pair of end plates 22, the sheet metal being formed around but not to a full loop, thereby leaving a gap 23 between two portions, the sheet metal being retained at its ends on the end plates 22.

A central stem 26 is of tubular form and is both slidable and rotational within central apertures 27 in the end plates 22, the central stem 26 having pins 28 and 29 near each respective end, one end containing a compression spring 30 abutting the end plate and being effective to urge the central stem 26 away from that end and the other end having its pin 28 extending outwardly from the central stem 26 to engage in diametrically opposite bayonet cap type slots 32 in the other end plate 22.

A pair of flanged bearings 35 are rotational on inwardly directed bosses 36 on the end plates 22 and these support drum end members 38 of circular shape which are generally disclike but have annular lands 39 thereon, the annular lands engaging within and supporting the ends of the drum 12 which is of sheet metal and is concentric with the central stem 26. A wire return spring 40 is disposed around the central stem 26 and secured at one end to a headed pin 41 in the central stem 26 and at the other end to a drum end member 38, the arrangement being such that the diameter of the center stem 26 is at least half the pitch diameter of the spring 40 so that the spring cannot snake even if it is of many times its diameter in length.

The end members 38 of the drum are provided with radially extending outstanding flanges 45 which are contained within the end plates 22, and are disposed outwardly from the ends of the gap 23 in the sheet metal housing 21, so that danger of fouling of the lines wound around the drum at the ends of the drum is substantially eliminated and this in turn results in a possible much lighter spring than with the usual conventional type of extensible clothesline. The central stem 26 however is axially movable against the compression spring 30 to release the pin 28 from its bayonet cap slots 32, and can be rotated to vary the tension to suit the specific requirements.

In this embodiment four lines 11 are wound around the drum 12, but are arranged so that when fully extended from the housing the clotheslines all are secured to the drum along approximately the same axially extending line. The extensible ends of the lines are secured to the spreader bar 13 which is of circular tubular cross section, the spreader bar being provided with two rectangular sleeves (FIGS. 3 and 4) to provide lands to engage the ends of pawl fingers of the pawl 16.

The pawl 16 is supported by a crosshead 48 on a post 49, (the crosshead alternatively being securable to the face of a wall), the crosshead 48 having two retention clips 51 secured thereto, the clips 51 being spaced from one another by a few inches. The clips 51 cooperate with respective hook members 17 to retain the bridge portion 52 of the pawl which is 'U'-shaped, the two legs 53 of the pawl 16 engaging the flat surfaces of the rectangular sleeves 47 on the spreader bar 13 when the spreader bar 13 is rotationally retained by its hook members 17. The pawl 16 is also provided with a pawl release arm 54 which is engageable against the crosshead 48. The bridge portion 52 has formed sections which function as stop means to limit rotation of the pawl release arm 54.

The arrangement is such that the tubular spreader bar 13 can simply be extended away from the drum housing 20 until the drum is completely unwound, whereupon the tubular spreader bar is positioned into the two hook members 17 to abut their inner surfaces, and rotated to thereby wind the clotheslines around the spreader bar, unwinding of the clotheslines being prevented by the pawls, and this providing a simple means of tension in the clotheslines. The pawl legs 53 are spring loaded by the pawl spring 56 against the respective flat surfaces of the rectangular sleeves 47. However a rubber block may be used if desired, or alternatively the pawl release arm can itself be so formed as to constitute spring means.

Since the two pairs of hinges are spaced apart, it becomes necessary to provide some means for ready centralizing of the spreader bar and this is achieved in this invention by the rectangular sleeves 47 on the spreader bar. The spreader bar 13 is also provided with handles 57 at the two ends to facilitate rotation.

A post 59 is provided for use with the housing 20 when the housing is not to be attached to a wall face for example, and the post 59 is arranged to be interchangeable with the post 49 at the pawl or spreader bar end. This then enables a "follow the leader" type of arrangement wherein one clothesline may be extended to be in line with the next.

In the event of there being a need for a series of extensible clotheslines in line with one another a second standard with its drum housing drum and line members is positioned rearwardly of the first. The end plates of the first housing however are provided with recesses arranged to engage the ends of a similar spreader bar. This enables a "follow the leader" type of installation to be made without the need for separate standards and their 'U'-shaped brackets.

A brief consideration of the above embodiment will indicate that the invention is very simple.

I claim:

1. An extensible clothesline of the type which has a series of lines secured at respective ends to a rotational drum and a spreader bar, comprising a central stem within the drum, a wire return spring surrounding the central stem, means securing one end of the wire return spring to the central stem and the other end to the drum, a cross head, a pair of spaced hook members on the crosshead forming retention means, said retention means being spaced from the drum and having abutment means cooperable with the spreader bar to releasably retain the spreader bar, the retention means further having a pawl pivoted on the crosshead, and a spring on the pawl urging the pawl into engagement with the spreader bar to form rotation limiting means engageable wit but releasable from the spreader bar, whereby the spreader bar when abutting the abutment means and rotated, winds the lines around the bar and thereby tensions the lines.

2. An extensible clothesline according to claim 1 further comprising rectangular sleeves on the spreader bar engageable by legs on the pawl to limit rotation.

3. An extensible clothesline according to claim 1 further comprising a drum housing, end plates on the drum housing, end members on the drum, and bearings between respective end members and end plates.

4. An extensible clothesline according to claim 3 wherein the drum end members are provided with annular lands supporting the ends of the drum, and outstanding flanges extend radially outwardly from the ends of the drum.

5. An extensible clothesline according to claim 4 wherein the drum is a sheet metal member formed to a circular shape.

6. An extensible clothesline according to claim 1 wherein the diameter of the central stem is at least half the pitch diameter of the return spring.

7. An extensible clothesline according to claim 3 further comprising a pin extending through the walls of the central stem near one end, one said end plate having an inwardly directed boss containing a central aperture rotationally and slidably engaging over said end of the stem, the inner end face of the boss having bayonet cap slots engageable with the ends of said pin, the other end of said stem containing a further pin abutting a compression spring, the compression spring bearing against the other said end plate to thereby urge the first said pin into engagement with said bayonet cap slots.